3,463,991
BRAKING APPARATUS FOR D-C MOTOR
Takeo Yuminaka and Tatsuo Iwasaka, Katsuta-shi, Japan, assignors to Hitachi, Ltd., Tokyo, Japan, a corporation of Japan
Filed Mar. 4, 1966, Ser. No. 531,988
Int. Cl. H02p 3/12, 3/22
U.S. Cl. 318—379       7 Claims

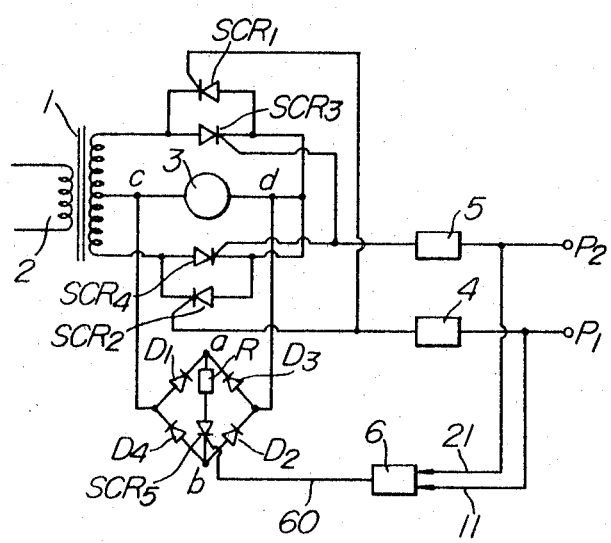

ABSTRACT OF THE DISCLOSURE

A braking apparatus for a DC motor operable both in normal and reverse directions wherein a diode bridge full-wave rectifier circuit is connected across the armature of the motor and a voltage controlled rectifier responsive to a control signal is connected in series with an impedance across the output of the diode bridge, a control signal being provided to the rectifier to provide braking of the motor in response to disconnection of the energizing DC voltage of either polarity from the armature.

---

The present invention relates to a braking apparatus for a DC motor and more particularly the invention relates to an apparatus for braking in the non-contact fashion a DC motor which is operable both in normal and reverse directions.

For braking and fast stopping the DC motor which is operable either in normal or reverse direction by the non-contact system, a parallel connection of a series circuit of a controlled rectifier and resistances with an armature of the motor may be made so that the brake control of the DC motor is readily adjusted by controlling the firing of the controlled rectifier.

However, in a DC motor that has to rotate both in a normal and reverse direction, as in the case of the electric door drive motor for elevators and the starting notch drive motor utilized in electric vehicles, it is important that the braking is quick and will not permit rotation of the motor by external forces after it has stopped. In view of its durability and reliability, the braking apparatus should be characterized by a small number of components all being as highly reliable as possible.

The general object of this invention is to provide a non-contact dynamic braking apparatus for a DC motor rotatable both in normal and reverse directions without using any more controlled rectifiers than the conventional dynamic braking apparatus for a unidirectional DC motor.

The figure shows one embodiment of the present invention in which: Numeral 1 designates an input transformer which is supplied power from an AC power source 2. The AC power supplied is full-wave rectified by means of two controlled rectifiers $SCR_1$ and $SCR_2$ for normal revolution and two controlled rectifiers $SCR_3$ and $SCR_4$ for reverse revolution and then applied to an armature 3 of the DC motor. The above-mentioned controlled rectifiers, $SCR_1$ and $SCR_2$ are fire-controlled by a normal revolution signal source $P_1$ through a pulse generator 4, and $SCR_3$ and $SCR_4$ by a reverse revolution signal source $P_2$ through a pulse generator 5, respectively. It should, however, be noted that the field circuit of the DC motor has been omitted from FIG. 1.

There are provided, in order to full-wave rectify the voltage between the terminals $c$ and $d$ of the armature 3, four diodes $D_1$, $D_2$, $D_3$ and $D_4$ being connected in a bridge circuit. Across the output terminals $a$ and $b$ of the bridge circuit are connected a controlled rectifier $SCR_5$ and a protective resistance R in series connection to form the essential part of the present invention. Numeral 6 denotes a NOT circuit receiving a signal 11 from the normal revolution signal source $P_1$ and a signal 21 from the reverse revolution signal source $P_2$ as the input voltage. (The NOT circuit is such that it only produces an output 60 when both of the input signals 11 and 21 are zero and otherwise produces no output.) The output of the NOT circuit 6 is connected to the firing electrode of the controlled rectifier $SCR_5$. This NOT circuit 6 can be of various types including the vacuum tubes or the semi-conductor diodes and any type of NOT circuit may be used so long as it is matchable to other elements of the apparatus, for example $SCR_5$, in durability and reliability.

Explanation will now be made in detail with respect to the operation of the braking apparatus for the DC motor according to this invention.

Firstly, upon operating the motor in the normal direction, a signal is applied to a pulse generator circuit 4 from the normal revolution signal source $P_1$ and the gate signals which are phase controlled within a range of synchronization with the AC power source 2 are applied to the controlled rectifiers, $SCR_1$ and $SCR_2$. These alternately repeat conductive and nonconductive states. At this moment to the armature 3 is applied a voltage which is positive at a point $c$ and negative at a point $d$ so that the motor revolves in the normal direction.

The output voltage from the normal revolution signal source $P_1$ provides the input signal 11 to the NOT circuit and also provides the input to the pulse generating circuit 4. However, since the output signal 60 of the negative circuit 6 remains zero so long as the input signal 11 exists, the controlled rectifier $SCR_5$ maintains a high resistance and accordingly the full-wave bridge circuit connected between the terminals $c$ and $d$ of the armature also maintains a high resistance. Therefore the operation of the motor in the normal direction continues without difficulty. When the load driven by said motor reaches a predetermined capacity, the output voltage of the normal revolution signal power source $P_1$ will be cut off, whereupon, if the reverse revolution signal is not provided, both the input signals 11 and 21 to the negative circuit 6 will become zero. Therefore, the NOT circuit 6 generates an output voltage 60 which in turn fires $SCR_5$. The armature voltage generated when the point $c$ is positive and the point $d$ is negative will be consumed through the loops of 3–C–$D_1$–$a$–R–$SCR_5$–$b$–$D_2$–$d$–3 and the motor is suddenly braked. In the foregoing has been illustrated the case when braking occurs automatically in response to the load of the motor. It is likewise possible to brake the motor suddenly and artificially by providing as for example a switch in the way of connection of both circuits of input signals 11 and 21 of the negative circuit 6 and by switching said circuits.

Next, when the motor is turned in the reverse direction according to the instruction for a reverse revolution and a signal is generated from $P_2$, the controlled rectifiers $SCR_3$ and $SCR_4$ are fire-controlled by the pulse generator 5 and the motor is operated by the predetermined constant speed characteristics, whereupon, to the armature 3 is applied a voltage, positive at the point $d$ and negative at the point $c$, so that the motor turns in the reverse direction. Similar to the foregoing case, if the output of the reverse revolution signal power source $P_2$ is cut off by the instruction for braking, the fire braking of the controlled rectifiers $SCR_3$ and $SCR_4$ are suspended. Simultaneously the controlled rectifier $SCR_5$ is fired by the output voltage of the NOT circuit 6. Thus through the loop of 3–$d$–$D_3$–$a$–R–$SCR_5$–$b$–$D_4$–$c$–3, the counter electromotive force of the armature 3 is consumed and dynamic braking can be applied.

As hereinbefore described, the present invention comprises a bridge rectifying circuit connected between both terminals of the armature of the D-C motor which is turnable both in normal and reverse directions, controlled rectifiers connected between the output terminals of the bridge circuit, said controlled rectifiers being fired according to the braking instruction, whereby braking is applied to the D-C motor. In contrast to the conventional braking devices of the D-C motor which is turnable only in one direction, the present invention is capable of controlling the motor both in normal and reverse directions by mere addition of the four diodes.

Conventional braking apparatuses can be practically used and modified without complicating their constructions. The diodes which are to be added thereto usually have longer endurance and better fidelity than the controlled rectifier, so that addition of the diodes will not reduce the overall endurance of the braking apparatus and its reliability.

It is also to be noted that the device according to this invention is applicable in any kind of the D-C motor. As for example, the invention can be applied in the D-C motor of the Ward Leonard type, whereupon the diode bridge rectifier circuit may be connected through the differential field coils and may obtain the same desired braking as heretofore described in the present invention.

What is claimed is:

1. A braking apparatus for use with a normally and reversely rotatable D-C motor comprising:
    a diode bridge rectifier circuit having input terminals connected across the armature of said motor and output terminals,
    a voltage controlled rectifier connected across the output terminals of said rectifier circuit,
    braking control means for selectively rendering said voltage controlled rectifier conductive to thereby effect dynamic braking of said motor during which the armature current of the motor flows through said diode bridge rectifier circuit and said voltage controlled rectifier, and
    actuating control means for applying a D-C voltage of selected polarity across said armature of said motor.

2. A braking apparatus as defined in claim 1 wherein said actuating control means includes first and second means connected across said armature for providing first and second D-C voltages of opposite polarity, respectively, and third and fourth means for selectively actuating one of said first and second means, respectively, to apply a D-C voltage to said armature.

3. A breaking apparatus as defined in claim 2 wherein said braking control means is responsive to non-actuation of both of said first and second means for providing a control signal actuating said voltage controlled rectifier.

4. A braking apparatus as defined in claim 1 wherein said braking control means includes means responsive to said actuating control means for actuating said voltage controlled rectifier only when no D-C voltage is applied to the armature of said motor.

5. A braking apparatus as defined in claim 1 wherein an impedance is connected in series with said voltage controlled rectifier for consuming the counter electromotive force of the armature.

6. A breaking apparatus as defined in claim 4 wherein said actuating control means includes an alternating current source, first and second additional voltage controlled rectifiers connected between said alternating current source and the armature of said motor for applying to said armature first and second polarities of D-C voltage in response to first and second control signals, respectively.

7. A braking apparatus as defined in claim 6 wherein said braking control means includes a NOT circuit having its output connected to the control electrode of said voltage controlled rectifier connected to said rectifier circuit, said first and second control signals being connected to the input of said NOT circuit so that said voltage controlled rectifier is actuated only in the absence of both of said first and second control signals.

References Cited

UNITED STATES PATENTS

| | | | |
|---|---|---|---|
| 2,605,454 | 7/1952 | Grepe | 318—380 |
| 3,202,899 | 8/1965 | Gambill et al. | 318—345 |
| 3,189,811 | 6/1965 | King | 318—269 |
| 3,286,148 | 11/1966 | Henderson | 318—211 |

ORIS L. RADER, Primary Examiner

K. L. CROSSON, Assistant Examiner

U.S. Cl. X.R.

318—258